(12) United States Patent
Iwaki et al.

(10) Patent No.: US 11,293,528 B2
(45) Date of Patent: Apr. 5, 2022

(54) WORKING VEHICLE

(71) Applicant: KANZAKI KOKYUKOKI MFG. CO., LTD., Amagasaki (JP)

(72) Inventors: Koji Iwaki, Amagasaki (JP); Kazuhiro Owada, Amagasaki (JP); Kengo Sasahara, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 325 days.

(21) Appl. No.: 16/667,324

(22) Filed: Oct. 29, 2019

(65) Prior Publication Data
US 2020/0132169 A1   Apr. 30, 2020

(30) Foreign Application Priority Data

Oct. 30, 2018   (JP) .............................. JP2018-203737

(51) Int. Cl.
F16H 61/66    (2006.01)
F16H 61/68    (2006.01)
F16H 61/70    (2006.01)
F16H 3/44     (2006.01)
F16D 21/00    (2006.01)
(Continued)

(52) U.S. Cl.
CPC ............... F16H 3/44 (2013.01); F16D 21/00 (2013.01); F16D 48/00 (2013.01); F16H 61/66 (2013.01); F16H 61/68 (2013.01); F16H 61/70 (2013.01); B60K 17/08 (2013.01); B60K 17/10 (2013.01);
(Continued)

(58) Field of Classification Search
CPC . F16H 3/44; F16H 61/66; F16H 61/68; F16H 61/70; B60K 17/08; B60K 17/10; B60W 2510/104; B60W 2710/1005
See application file for complete search history.

(56) References Cited

U.S. PATENT DOCUMENTS 6,447,423 B1 * 9/2002 Cannon ................. F16H 61/431
                                                    477/46
7,324,885 B2 * 1/2008 Sah ........................ F16H 61/70
                                                    701/58
(Continued)

FOREIGN PATENT DOCUMENTS

EP    2965938 A2 *  1/2016  .......... B60W 30/146
EP    3647628 A1 *  5/2020  ............. F16H 47/04
JP    4162328 B     10/2008

Primary Examiner — Sherry L Estremsky
(74) Attorney, Agent, or Firm — Sterne, Kessler, Goldstein & Fox P.L.L.C.

(57) ABSTRACT

A working vehicle of this invention includes a main speed change structure that includes a continuously variable speed change structure such as an HMT structure and a multi-speed speed change structure capable of switching between a first power transmission state with a first gear ratio and a second power transmission state with a second gear ratio providing a higher speed than the first gear ratio. A control device causes the continuously variable speed change structure to be accelerated to a forward travel side in accordance with an accelerating operation of a speed change operation member in a forward travel direction, and causes the multi-speed speed change structure to be changed from a first power transmission state to a second power transmission state when the rotational speed of the speed change output shaft reaches a switching speed set to exceed a work speed range.

11 Claims, 6 Drawing Sheets

(51) Int. Cl.
*F16D 48/00* (2006.01)
*B60K 17/08* (2006.01)
*B60K 17/10* (2006.01)

(52) U.S. Cl.
CPC ............... *B60W 2510/104* (2013.01); *B60W 2710/1005* (2013.01); *B60W 2710/1016* (2013.01)

(56) References Cited

U.S. PATENT DOCUMENTS

2004/0209718 A1* 10/2004 Ishibashi ........... B60W 30/1888
    474/18
2011/0099993 A1* 5/2011 Ishii ................ F16H 47/04
    60/436
2012/0065854 A1* 3/2012 Stoller ............... F16H 61/10
    701/60

* cited by examiner

WORKING VEHICLE

TECHNICAL FIELD

The present invention relates to a working vehicle wherein a continuously variable speed change structure and a multi-speed speed change structure are disposed in series in a driveline.

BACKGROUND ART

For example, Japanese Patent No. 4162328 (hereinafter referred to as Patent Document 1) proposes a working vehicle wherein a continuously variable speed change structure including a hydrostatic/mechanical continuously variable speed change structure (an HMT structure) formed of a hydrostatic continuously variable speed change mechanism (HST) and a planetary gear mechanism and a multi-speed speed change structure having a plurality of speed change gears are disposed in series in a driveline.

A working vehicle having such a configuration is useful in that the vehicle speed range in which the speed can be changed in a stepless manner can be expanded.

The working vehicle described in Patent Document 1 further includes a lockup mechanism to suppress a vehicle speed change during the speed change operation of the multi-speed speed change structure.

Specifically, the HST has a pump for inputting rotational power from a drive source, a motor fluidly driven by the pump, and an output adjusting member for changing the capacity of at least one of the pump and the motor (for example, the pump). The output adjusting member functions in accordance with the operating amount of a speed change operation member capable of being manually operated, and, accordingly, the rotational speed of the motor is changed in a stepless manner.

The planetary gear mechanism is configured so as to combine rotational power from the HST input into a sun gear and rotational power from the drive source input into a carrier, and output the combined rotational power from an internal gear toward the multi-speed speed change structure. Here, the lockup mechanism is configured so as to synchronously rotate the carrier and the internal gear only during the speed change period of the multi-speed speed change structure.

The speed change operation in the working vehicle described in Patent Document 1 will now be described by way of the case where the multi-speed speed change structure is accelerated from the first gear stage to the second gear stage.

When the speed change operation member is operated in the accelerating direction within a first gear stage operation range, the output adjusting member is moved in the direction in which the speed of the HST output is changed from a first HST speed (for example, the reverse rotation side maximum speed) to a second HST speed (for example, the normal rotation side maximum speed).

When the speed change operation member is operated to the boundary between the first gear stage operation range and a second gear stage operation range, the output adjusting member is moved to a second HST speed position (for example, the normal rotation side maximally tilted position), and the HST output is brought into a second HST speed (for example, the normal rotation side maximum speed) state. This state is the maximum speed output state of the HMT structure in the first gear stage engaged state of the multi-speed structure.

When the speed change operation member is operated into the second gear stage operation range by exceeding the boundary between the first gear stage operation range and the second gear stage operation range, the multi-speed speed change structure is accelerated from the first gear stage to the second gear stage accordingly.

During this speed change period of the multi-speed speed change structure, as described above, the internal gear and the carrier are connected by the locking mechanism and synchronously rotated. Thus, rotational power synchronized with rotational power that is input from the drive source into the carrier is transmitted to the multi-speed speed change structure that receives rotational power from the internal gear.

On the other hand, during this speed change period of the multi-speed speed change structure, the output adjusting member is in a free state in which the output adjusting member is uncoupled with the speed change operation member. Accordingly, the motor shaft and the sun gear that are operatively connected to each other are rotated at a rotational speed determined by the rotational speed of the internal gear and the carrier that are connected by the locking mechanism and synchronously rotated by rotational power from the drive source (hereinafter referred to as a "speed change period rotational speed").

Thus, the output adjusting member is returned in the direction toward the first HST speed position from the second HST speed position (for example, the normal rotation side maximally tilted position) until a position where HST output corresponding to the speed change period rotational speed of the sun gear is attained (hereinafter referred to as a speed change period reference position).

Thereafter, when the speed change operation member is operated in the accelerating direction within the second gear stage operation range, the output adjusting member is operated from the speed change period reference position toward the second HST speed position, and the rotational speed of the motor shaft is accelerated. Thus, the rotational speed of the sun gear rotationally driven by HST output from the motor shaft is accelerated, and the rotational speed of the internal gear is accelerated.

Hence, in the transmission described in Patent Document 1, rotational power that is input into the sun gear is decelerated from the second HST speed (for example, the normal rotation side maximum speed) to the speed change period rotational speed during the speed change operation of the multi-speed speed change structure.

Although the working vehicle described in Patent Document 1 is useful in being capable of suppressing the extent of a change in vehicle travel speed during the speed change of the multi-speed speed change structure, it does not take in consideration the relationship between the speed change timing of the multi-speed speed change structure and the vehicle travel speed.

That is, working vehicles such as tractors and combines that tow a ground work implement often perform heavy duty work such as ploughing, tilling, leveling, and harvesting while traveling at low speed. Generally, concerning such working vehicles, the vehicle travel speed when performing such heavy duty work is set as a work speed range.

Performing the speed change operation of the multi-speed speed change structure within the work speed range creates a situation in which sufficient driving force is not transmitted to drive wheels while a heavy load is exerted on the working vehicle, and thus there is a possibility that the vehicle travel speed is greatly reduced during the course of speed change operation from the disengagement of a speed change gear engaged prior to the speed change operation until completion of the engagement of a speed change gear that should be engaged after the speed change operation, thus creating a shock that deteriorates ride quality. In such a case, a large load is exerted on the components of the driveline including the multi-speed speed change structure when a speed change gear stage that should be engaged after the speed change operation is engaged.

SUMMARY OF THE INVENTION

The present invention has been conceived in view of the conventional art described above, and an object of the present invention is to provide a working vehicle comprising a continuously variable speed change structure including an HST and the like and a multi-speed speed change structure that are disposed in series in a driveline, wherein a load exerted on the components of the driveline when performing a speed change operation during work is prevented or reduced as much as possible.

In order to achieve the object, the present invention provides a working vehicle including a drive source, drive wheels, a speed change output shaft for outputting rotational power toward the drive wheels, a main speed change structure for changing a speed of rotational power from the drive source and operatively transmitting the resulting rotational power to the speed change output shaft, a speed change operation member, an output sensor for directly or indirectly detecting a rotational speed of the speed change output shaft, and a control device responsible for operational control of the main speed change structure, wherein the main speed change structure comprises a continuously variable speed change structure for changing a speed of rotational power operatively input from the drive source in a stepless manner, and a multi-speed speed change structure capable of switching between at least a first power transmission state with a first gear ratio and a second power transmission state with a second gear ratio providing a higher speed than the first gear ratio; the control device, based on a detection signal of the output sensor, causes the continuously variable speed change structure to be accelerated to a forward travel side in accordance with an accelerating operation of the speed change operation member in a forward travel direction while causing the multi-speed speed change structure to be in a first power transmission state, in a low speed state until the rotational speed of the speed change output shaft reaches a predetermined switching speed; causes the continuously variable speed change structure to be decelerated to a second power transmission state reference speed while causing the multi-speed speed change structure to be changed from the first power transmission state to a second power transmission state, when the rotational speed of the speed change output shaft reaches the switching speed; and causes the continuously variable speed change structure to be accelerated from the second power transmission state reference speed to the forward travel side in accordance with an accelerating operation of the speed change operation member to the forward travel side while causing the multi-speed speed change structure to be in the second power transmission state, in a high speed state in which the rotational speed of the speed change output shaft is higher than the switching speed; and the switching speed is set to exceed a work speed range.

The working vehicle according to the present invention makes it possible to effectively prevent or reduce a large load from being exerted on components forming a driveline in the speed change operation during work. The working vehicle according to the present invention makes it also possible to realize a shock-free stable traveling state during work regardless of the type of the ground work implement attached to the working vehicle.

For example, the multi-speed speed change structure may have first and second power transmission mechanisms capable of operatively transmitting rotational power operatively input from the continuously variable speed change structure to the speed change output shaft at the first gear ratio and the second gear ratio, respectively, and first and second clutch mechanisms for engaging and disengaging power transmission of the first and second power transmission mechanisms, respectively. In this case, the multi-speed speed change structure attains the first power transmission state by engaging the first clutch mechanism and disengaging the second clutch mechanism, and attains the second power transmission state by disengaging the first clutch mechanism and engaging the second clutch mechanism.

In a first embodiment of the present invention, the continuously variable speed change structure includes an HST for changing a speed of rotational power operatively input from the drive source into the pump shaft between at least a first HST speed and a second HST speed in a stepless manner in accordance with an operational position of the output adjusting member and outputting the resulting rotational power from a motor shaft, and a planetary gear mechanism having first to third elements wherein the planetary gear mechanism combines rotational power operatively input from the drive source to the first element and rotational power operatively input from the HST to the third element, and outputs the combined rotational power from the second element as output of the continuously variable speed change structure. The main speed change structure further includes an HST power transmission mechanism capable of operatively transmitting rotational power of the motor shaft to the speed change output shaft, and an HST clutch mechanism for engaging and disengaging power transmission of the HST power transmission mechanism.

In the first embodiment, the control device cancels the first power transmission state and attains an HST power transmission state in which the HST clutch mechanism is engaged in a state until the rotational speed of the speed change output shaft reaches an initial speed that is lower than the switching speed, and cancels the HST power transmission state and attains the first power transmission state in a state in which the rotational speed of the speed change output shaft is between the initial speed and the switching speed. The control devices further causes the output adjusting member to be operated such that, in the HST power transmission state, a speed of HST output is changed from the first HST speed to the second HST speed in accordance with an accelerating operation of the speed change operation member to a forward travel side. In the first power transmission state, the speed of the HST output is changed from the second HST speed to the first HST speed in accordance with an accelerating operation of the speed change operation member to a forward travel side. When switching from the first power transmission state to the second power transmission state, the speed of HST output is changed from an HST rotational speed, which is attained at a time of the switching, toward a second HST speed side to a second power transmission state reference HST speed at which a rotational speed of the second element is at a second power transmission state reference speed; and in the second power transmission state, the speed of HST output is changed from the second power transmission state reference HST speed toward the first HST speed in accordance with an accelerating operation of the speed change operation member to the forward travel side. In this case, the planetary gear mechanism is configured such that the combined rotational power output from the second element is accelerated as the speed of HST output is changed from the second HST speed side to a first HST speed side.

In the first embodiment, the HST, the planetary gear mechanism, the HST power transmission mechanism, and the first power transmission mechanism are preferably configured such that there is no speed difference in the rotational speed of the speed change output shaft when switching between the HST power transmission state and the first power transmission state.

In a preferable configuration of the first embodiment, HST output at the first HST speed is reverse rotation side rotational power for reverse travel, the HST output at the second HST speed is normal rotation side rotational power for forward travel, and the HST is capable of outputting rotational power in both normal and reverse directions, with a neutral speed being provided between the first and second HST speeds. The main speed change structure further has a reverse travel power transmission mechanism capable of operatively transmitting rotational power of the second element to the speed change output shaft as reverse travel rotational power, and a reverse travel clutch mechanism for engaging and disengaging power transmission of the reverse travel power transmission mechanism.

In this preferable configuration, the control device attains the HST power transmission state in a state until the rotational speed of the speed change output shaft reaches a reverse travel side switching speed, and cancels the HST power transmission state and engages the reverse travel clutch mechanism to attain a reverse travel power transmission state in which the rotational power of the second element is operatively transmitted to the speed change output shaft via the reverse travel power transmission mechanism when the rotational speed of the speed change output shaft is greater than or equal to the reverse travel side switching speed. The control device further causes the output adjusting member to be operated such that, in the HST power transmission state, the speed of HST output is a neutral speed in accordance with an operation of the speed changing operation member to a zero speed position, and the speed of HST output is changed from the neutral speed toward the first HST speed in accordance with an accelerating operation of the speed change operation member from the zero speed position to a reverse travel side. When switching from the HST power transmission state to the reverse travel power transmission state, the speed of HST output is changed from a rotational speed, which is attained at a time of the switching, to the second HST speed side to a predetermined extent; and, in the reverse travel power transmission state, the speed of HST output is changed toward the first HST speed in accordance with an accelerating operation of the speed change operation member to the reverse travel side.

The control device preferably causes the output adjusting member to be operated such that HST output is at a reverse travel power transmission state reference HST speed when the HST power transmission state is switched to the reverse travel power transmission state. The reverse travel power transmission state reference HST speed is set such that the rotational speed of the speed change output shaft attained when the HST output is at the first HST speed in the HST power transmission state matches the rotational speed of the speed change output shaft attained when the HST output is at the reverse travel power transmission state reference HST speed in the reverse travel power transmission state.

In a second embodiment of the present invention, the continuously variable speed change structure includes an HST for changing a speed of rotational power operatively input from the drive source into the pump shaft between at least a first HST speed and a second HST speed in a stepless manner in accordance with an operational position of the output adjusting member and for outputting the resulting rotational power from a motor shaft as output of the continuously variable speed change structure. The HST is capable of outputting rotational power in both normal and reverse directions such that HST output at the first HST speed is reverse rotation side rotational power for reverse travel, the HST output at the second HST speed is normal rotation side rotational power for forward travel, and the HST output at a neutral speed between the first and second HST speeds is a substantially zero rotational speed.

In this case, the control device causes the output adjusting member to be operated such that the HST is at the neutral speed in accordance with an operation of the speed change operation member to a zero speed position. The HST output is accelerated to a reverse rotation side in accordance with an accelerating operation of the speed change operation member from the zero speed position to a reverse travel side, and the HST output is accelerated to a normal rotation side in accordance with acceleration operation of the speed change operation member from the zero speed position to the forward travel side. In the second embodiment, when the HST output is at the second HST speed in the first power transmission state, the rotational speed of the speed change output shaft reaches the switching speed.

In a third embodiment of the present invention, the continuously variable speed change structure comprises an HST for changing a speed of rotational power operatively input from the drive source into the pump shaft between at least a first HST speed and a second HST speed in a stepless manner in accordance with an operational position of the output adjusting member and for outputting the resulting rotational power from a motor shaft. The continuously variable speed change structure further comprises a planetary gear mechanism having first to third elements wherein the planetary gear mechanism combines rotational power operatively input from the drive source to the first element and rotational power operatively input from the HST to the third element, and outputs the combined rotational power from the second element as output of the continuously variable speed change structure. The main speed change structure further has a reverse travel power transmission mechanism capable of operatively transmitting the rotational power of the second element to the speed change output shaft as reverse travel rotational power, and a reverse travel clutch mechanism for engaging and disengaging power transmission of the reverse travel power transmission mechanism. An HMT structure formed of the HST and the planetary gear mechanism is configured such that HMT output that is output from the second element is at a zero speed when HST output is at the first HST speed, and is accelerated as the speed of the HST output is changed from the first HST speed to the second HST speed.

In the third embodiment, the control device cancels the first power transmission state and engages the reverse travel clutch mechanism to attain a reverse travel power transmission state in which the rotational power of the second element is operatively transmitted to the speed change output shaft via the reverse travel power transmission mechanism when the speed change operation member is operated from a zero speed position to a reverse travel side. The control device further causes the output adjusting member to be operated such that the HST output is at the first HST speed in accordance with an operation of the speed changing operation member to the zero speed position, and the HST output is accelerated from the first HST speed to the second HST speed in accordance with an accelerating operation of the speed change operation member from the zero speed position to a forward travel side and a reverse travel side. In the third embodiment, when the HST output is at the second HST speed in the first power transmission state, the rotational speed of the speed change output shaft reaches the switching speed.

In any one of the various configurations of the present invention, the second power transmission state reference speed is set to a speed such that the rotational speed of the speed change output shaft is not different before and after switching from the first power transmission state to the second power transmission state.

In the configuration in which the continuously variable speed change structure includes the HST and the planetary gear mechanism, a carrier, an internal gear and a sun gear of the planetary gear mechanism, for example, form the first, second, and third elements, respectively.

The working vehicle according to the present invention may further include an auxiliary speed change structure disposed in the driveline on a more downstream side in a power transmission direction than the speed change output shaft is.

DETAILED DESCRIPTION OF THE PREFERRED EMBODIMENTS

First Embodiment

Figure 1:
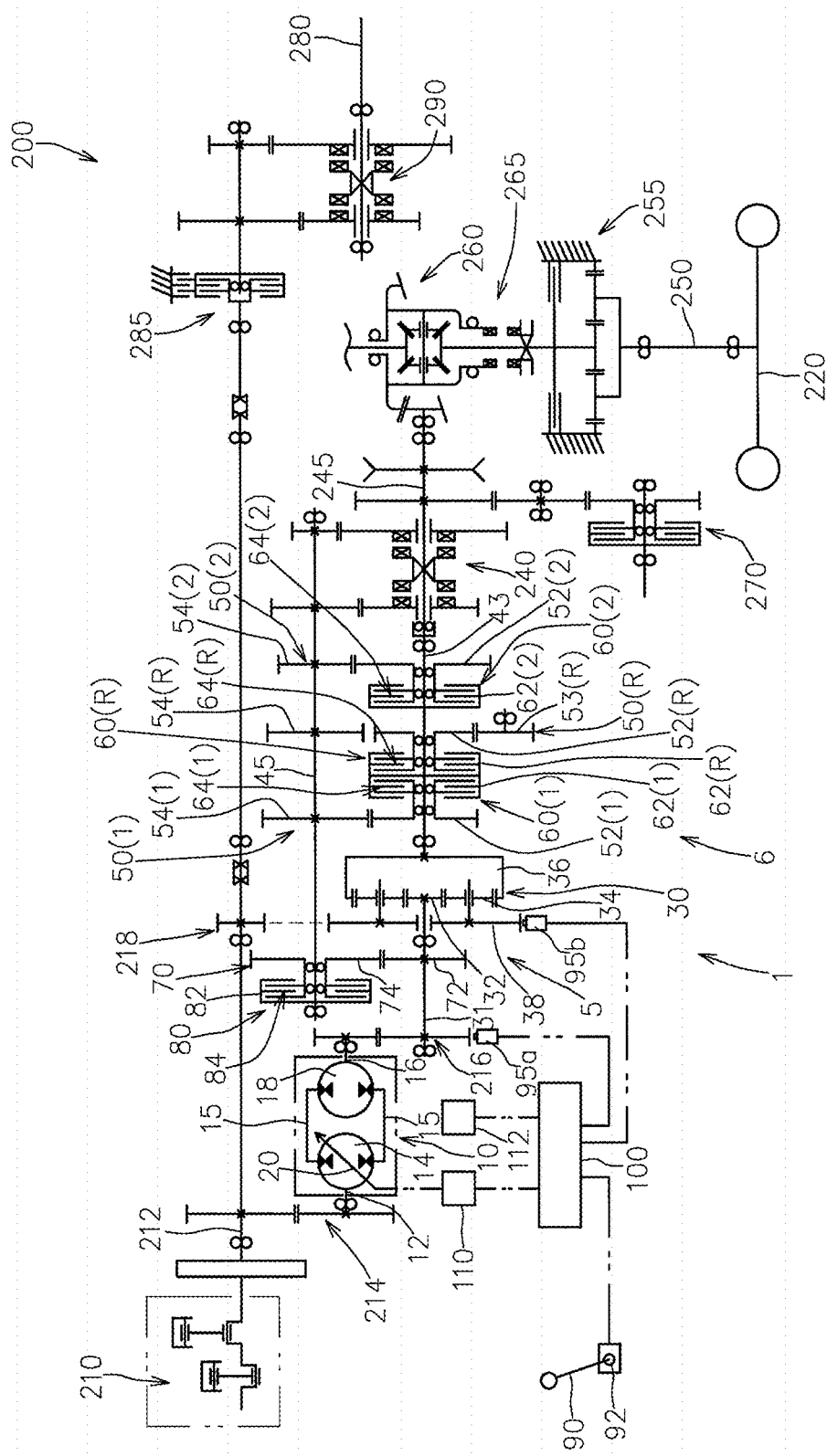
FIG. 1 is a schematic view of a power transmission of a working vehicle according to a first embodiment of the present invention.

Below, one embodiment of the working vehicle according to the present invention will now be described with reference to the appended drawings. FIG. 1 shows a schematic view of the power transmission of a working vehicle 200 of the present embodiment.

As shown in FIG. 1, the working vehicle 200 includes a drive source 210; drive wheels 220; a speed change output shaft 45 for outputting rotational power toward the drive wheels 220; a main speed change structure 1 for changing the speed of rotational power from the drive source 210 and operatively transmitting the resulting rotational power to the speed change output shaft 45; a speed change operation member 90 such as a shift lever, the operational position of which can be detected by an operational position sensor 92; an output sensor 95 for directly or indirectly detecting the rotational speed of the speed change output shaft 45; and a control device 100 responsible for operational control of the main speed change structure 1.

The main speed change structure 1 has a continuously variable speed change structure 5 for changing the speed of rotational power operatively input from the drive source 210 in a stepless manner; first and second power transmission mechanisms 50(1), 50(2) disposed in series relative to the continuously variable speed change structure 5; and first and second clutch mechanisms 60(1), 60 (2) for engaging and disengaging the power transmission of the first and second power transmission mechanisms 50(1), 50(2), respectively.

In the present embodiment, the continuously variable speed change structure 5 has a hydrostatic continuously variable speed change mechanism (HST) 10 and a planetary gear mechanism 30 for forming an HMT structure (a hydrostatic/mechanical continuously variable speed change structure) in cooperation with the HST 10.

As shown in FIG. 1, the HST 10 has a pump shaft 12 operatively rotationally driven by the drive source 210; a hydraulic pump 14 supported by the pump shaft 12 so as to be incapable of relative rotation; a hydraulic motor 18 fluidly connected to the hydraulic pump 14 via a pair of hydraulic oil lines 15 so as to be hydraulically rotationally driven by the hydraulic pump 14; a motor shaft 16 for supporting the hydraulic motor 18 so as to be incapable of relative rotation; and an output adjusting member 20 for changing the capacity of at least one of the hydraulic pump 14 and the hydraulic motor 18.

The HST 10 is capable of changing the ratio of the rotational speed of HST output that is output from the motor shaft 16 relative to the rotational speed of power that is input into the pump shaft 12 (i.e., the gear ratio of the HST 10) in a stepless manner in accordance with the operational position of the output adjusting member 20.

That is, in the case where the rotational speed of rotational power operatively input from the drive source 210 into the pump shaft 12 is regarded as a reference input speed, the HST 10 changes the speed of rotational power at the reference input speed in a stepless manner so as to be rotational power at least between a first HST speed and a second HST speed in accordance with the operational position of the output adjusting member 20, and outputs the resulting rotational power from the motor shaft 16.

In the present embodiment, as shown in FIG. 1, the pump shaft 12 is connected via a gear train 214 to a main drive shaft 212 operatively connected to the drive source 210.

In the present embodiment, the HST 10 is capable of switching between the normal and reverse rotational directions of the HST output. That is, in the case where the direction of rotation at the reference input speed is regarded as a normal rotational direction, the HST 10 is configured such that rotational power having a first HST speed, the rotational direction of which is one of the normal and reverse directions (for example, the reverse rotational direction), is output from the motor shaft 16 when the output adjusting member 20 is placed in a first operational position, and rotational power having a second HST speed, the rotational direction of which is the other of the normal and reverse directions (for example, the normal rotational direction) is output from the motor shaft 16 when the output adjusting member 20 is placed in the second operational position.

In this case, when the output adjusting member 20 is placed in a neutral position between the first and second operational positions, the rotational speed of the HST output is at a neutral speed (a zero speed).

In the present embodiment, as shown in FIG. 1, the HST 10 has, as the output adjusting member 20, a movable swash plate that changes the capacity of the hydraulic pump 14 by being pivoted around a pivot axis and that can be pivoted to one side and the other side around the pivot axis across a neutral position where the amount of discharge from the hydraulic pump 14 is zero.

When the movable swash plate is placed in the neutral position, there is no discharge of pressurized oil from the hydraulic pump 14, and the HST 10 is in a neutral state in which the output of the hydraulic motor 18 is zero. When the movable swash plate is pivoted from the neutral position to the normal rotation side on one side around the pivot axis, pressurized oil is supplied from the hydraulic pump 14 to one of the pair of hydraulic oil lines 15, thus this hydraulic oil line 15 becomes the high pressure side, and the other hydraulic line 15 becomes the low pressure side. Thus, the hydraulic motor 18 is rotationally driven in the normal rotation direction, and the HST 10 is in a normal rotation output state.

On the other hand, when the movable swash plate is pivoted from the neutral position to the reverse rotation side on the other side around the pivot axis, pressurized oil is supplied from the hydraulic pump 14 to the other of the pair of hydraulic oil lines 15, thus this hydraulic oil line 15 becomes the high pressure side, and the aforementioned hydraulic line 15 becomes the low pressure side. Thus, the hydraulic motor 18 is rotationally driven in the reverse rotation direction, and the HST 10 is in a reverse rotation output state. In the HST 10, the capacity of the hydraulic motor 18 is fixed by a fixed swash plate.

As shown in FIG. 1, the output adjusting member 20 is operatively controlled by the control device 100 based on the operation of the speed change operation member 90. That is, the control device 100 causes the output adjusting member 20 to be operated via an actuator 110 based on the operation on the speed change operation member 90. The actuator 110 may have a variety of configurations such as an electric motor or a hydraulic servo mechanism as long as the actuator 110 is operatively controlled by the control device 100.

The planetary gear mechanism 30 as shown in FIG. 1 has a sun gear 32, planetary gears 34 meshed with the sun gear 32, an internal gear 36 meshed with the planetary gears 34, and a carrier 38 that supports the planetary gears 34 so as to be axially rotatable and that axially rotates around the sun gear 32 in conjunction with the revolution of the planetary gears 34 around the sun gear 32, wherein the sun gear 32, the carrier 38, and the internal gear 36 form three planetary elements.

A third element, which is one of the three planetary elements, is operatively connected to the motor shaft 16, and the third element functions as a variable power input part for inputting an HST output.

As shown in FIG. 1, in the present embodiment, the sun gear 32 is the third element. Specifically, in the present embodiment, the sun gear 32 is connected to a planetary input shaft 31 that is operatively connected to the motor shaft 16 via a gear train 216.

A first element, which is one of the three planetary elements, functions as a reference power input part for inputting reference rotational power from the drive source 210. As shown in FIG. 1, in the present embodiment, the carrier 38 is the first element. In the present embodiment, the carrier 38 is operatively connected to the main drive shaft 212 via a gear train 218.

A second element, which is one of the three planetary elements, functions as an output part for outputting combined rotational power. As shown in FIG. 1, in the present embodiment, the internal gear 36 is the second element. In the present embodiment, the internal gear 36 is operatively connected to a speed change intermediate shaft 43.

The first power transmission mechanism 50(1) is configured so as to be capable of operatively transmitting rotational power operatively input from the continuously variable speed change structure 5 (the planetary gear mechanism 30 in the present embodiment) to the speed change output shaft 45 as forward travel rotational power at a first gear ratio.

In the present embodiment, the first power transmission mechanism 50(1) is capable of transmitting rotational power from the speed change intermediate shaft 43 to the speed change output shaft 45 at the first gear ratio. Specifically, the first power transmission mechanism 50(1) has a first drive gear 52(1) supported by the speed change intermediate shaft 43 so as to be capable of relative rotation and a first driven gear 54(1) meshed with the first drive gear 52(1) and supported by the speed change output shaft 45 so as to be incapable of relative rotation.

The second power transmission mechanism 50(2) is configured so as to be capable of operatively transmitting rotational power operatively input from the continuously variable speed change structure 5 (the planetary gear mechanism 30 in the present embodiment) to the speed change output shaft 45 as forward travel rotational power at a second gear ratio at which the speed change output shaft 45 is rotated at a higher speed than the first gear ratio.

In the present embodiment, the second power transmission mechanism 50(2) is capable of transmitting rotational power from the speed change intermediate shaft 43 to the speed change output shaft 45 at the second gear ratio. Specifically, the second power transmission mechanism 50(2) has a second drive gear 52(2) supported by the speed change intermediate shaft 43 so as to be capable of relative rotation and a second driven gear 54(2) meshed with the second drive gear 52(2) and supported by the speed change output shaft 45 so as to be incapable of relative rotation.

In the present embodiment, the first and second clutch mechanisms 60(1), 60(2) are configured so as to be capable of engaging and disengaging power transmission from the speed change intermediate shaft 43 to the corresponding first and second drive gears 52(1), 52(2).

The first and second power transmission mechanisms 50(1), 50(2) and the first and second clutch mechanisms 60(1), 60(2) form a multi-speed speed change structure 6 for changing the speed of the output of the continuously variable speed change structure 5 (in the present embodiment, the HMT structure) in a stepwise manner to transmit the resulting output to the speed change output shaft 45.

In the present embodiment, the first and second clutch mechanisms 60(1), 60(2) are friction plate-type clutch mechanisms.

Specifically, the first clutch mechanism 60(1) has a first clutch housing 62(1) supported by the speed change intermediate shaft 43 so as to be incapable of relative rotation; a first friction plate group 64(1) including a first drive-side friction plate supported by the first clutch housing 62(1) so as to be incapable of relative rotation and a first driven-side friction plate supported by the first drive gear 52(1) so as to be incapable of relative rotation, wherein the first driven-side friction plate faces the first drive-side friction plate; and a first piston (not shown) for frictionally engaging the first friction plate group 64(1).

The second clutch mechanism 60(2) has a second clutch housing 62(2) supported by the speed change intermediate shaft 43 so as to be incapable of relative rotation; a second friction plate group 64(2) including a second drive-side friction plate supported by the second clutch housing 62(2) so as to be incapable of relative rotation and a second driven-side friction plate supported by the second drive gear 52(2) so as to be incapable of relative rotation, wherein the second driven-side friction plate faces the second drive-side friction plate; and a second piston (not shown) for frictionally engaging the second friction plate group 64(2). The first and second clutch mechanisms 60(1), 60(2) are configured so as to perform engagement and disengagement in accordance with, for example, the supply and discharge of pressurized oil. In this case, for example, an electromagnetic valve group 112 (see FIG. 1) including an electromagnetic valve for switching the supply and discharge of pressurized oil are provided, wherein the position of the electromagnetic valve is controlled by the control device 100.

As shown in FIG. 1, the working vehicle 200 includes an auxiliary speed change structure 240 disposed in the driveline downstream of the main speed change structure 1, that is, located farther along the power transmission direction.

The auxiliary speed change structure 240 is capable of changing the rotational speed of driving force between two stages, i.e., a high speed stage and a low speed stage, between the speed change output shaft 45 and a travel power transmission shaft 245. The auxiliary speed change structure 240 is operated to change gears when the working vehicle 200 is not in motion, and, for example, may have a plurality of gear trains and a dog clutch-type slider for bringing any one of the plurality of gear trains into a power transmitting state.

The working vehicle 200 has a pair of right and left main drive wheels as the drive wheels 220. Accordingly, the working vehicle 200, as shown in FIG. 1, further has a pair of main drive axles 250 for respectively driving the pair of main drive wheels, and a differential mechanism 260 for differentially transmitting the rotational power of the travel power transmission shaft 245 to the pair of main drive axles 250.

As shown in FIG. 1, the working vehicle 200 further has a travel braking mechanism 255 for selectively applying braking force to the main drive axles 250; a differential locking mechanism 265 for synchronously driving the pair of main drive axles 250 by rotational power from the travel power transmission shaft 245 in a forcible manner; and a driving force extracting mechanism 270 for auxiliary driving wheels, wherein the driving force extracting mechanism 270 is capable of selectively outputting rotational power branched from the travel power transmission shaft 245 toward the auxiliary driving wheels.

The working vehicle 200 has a PTO shaft 280 for outputting rotational power to the outside as well as a PTO clutch mechanism 285 and a PTO speed change mechanism 290 disposed in a PTO power transmission path extending from the drive source 210 to the PTO shaft 280.

Figure 2A:
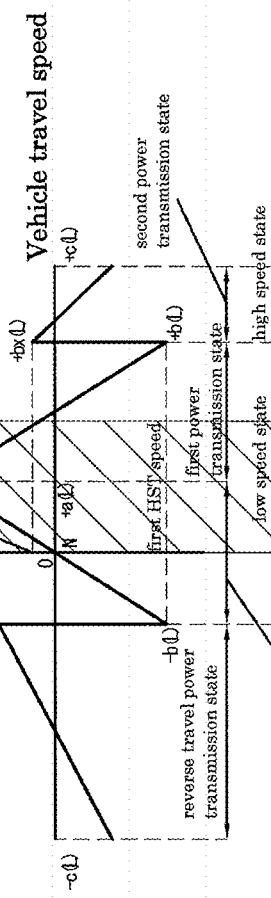
FIGS. 2A and 2B are graphs showing a relationship between a vehicle travel speed and a rotational speed of HST output in the working vehicle according to the first embodiment, and are graphs obtained when a low speed stage and a high speed stage of an auxiliary speed change structure are engaged, respectively.
Figure 2B:
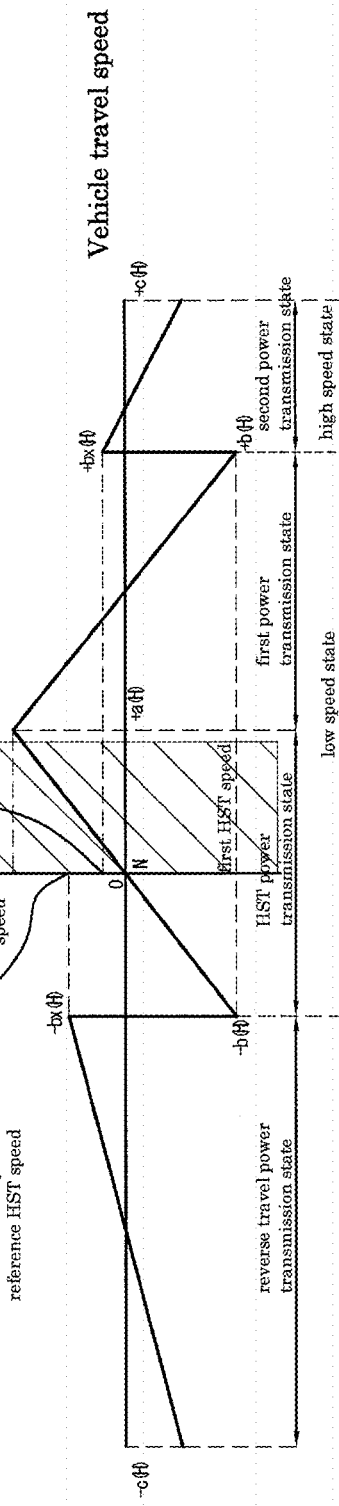

Below, operational control of the control device 100 will now be described. FIG. 2 is a graph showing the relationship between the vehicle travel speed and the rotational speed of HST output concerning the working vehicle 200. FIGS. 2A and 2B are graphs obtained when a low speed stage and a high speed stage of the auxiliary speed change structure 240 are engaged, respectively.

The control device 100 is configured so as to attain a first power transmission state in which the first clutch mechanism 60(1) is engaged and the second clutch mechanism 60(2) is disengaged in a low speed state until the rotational speed of the speed change output shaft 45 reaches a predetermined switching speed, and attain a second power transmission state in which the first clutch mechanism 60(1) is disengaged and the second clutch mechanism 60(2) is engaged in a high speed state in which the rotational speed of the speed change output shaft 45 is greater than or equal to the switching speed, based on the detection signal of the output sensor 95.

The output sensor 95 may take a variety of forms as long as the rotational speed of the speed change output shaft 45 can be directly or indirectly recognized, such as a sensor for detecting the rotational speed of the speed change output shaft 45, and a sensor for detecting the rotational speed of the drive wheels 220 or the drive axles 250. In the present embodiment, as shown in FIG. 1, the output sensor 95 includes a rotational speed sensor 95a for detecting the rotational speed of variable power that is input from the HST 10 into the third element (the sun gear 32 in the present embodiment) and a rotational speed sensor 95b for detecting the rotational speed of reference rotational power that is input from the drive source 210 into the first element (the carrier 38 in the present embodiment), and the control device 100 is configured so as to comprehensively calculate the rotational speed of the speed change output shaft 45 based on the detection signals of the rotational speed sensors 95a, 95b.

As described above, in the present embodiment, the continuously variable speed change structure 5 is an HMT structure having the HST 10 and the planetary gear mechanism 30. The control device 100 is configured so as to perform operational control of the output adjusting member 20 based on the operational position of the speed change operation member 90 provided by the operational position sensor 92 and the detection signal from the output sensor 95 as operational control of the continuously variable speed change structure 5.

As long as the output state of the HST 10 can be detected, the rotational speed sensor 95a may take a variety of forms such as a sensor for detecting the rotational speed of the motor shaft 16 and a sensor for detecting the operational position of the output adjusting member 20.

As shown in FIGS. 2A and 2B, in the present embodiment, the low speed state until the rotational speed of the speed change output shaft 45 reaches a predetermined switching speed includes, in addition to the first power transmission state, an HST power transmission state attained when the rotational speed of the speed change output shaft 45 is no higher than an initial speed that is set to be lower than the switching speed. The first power transmission state is attained when the rotational speed of the speed change output shaft 45 is between the initial speed and the switching speed.

In reference to the vehicle travel speed in FIG. 2, the initial speed of the speed change output shaft 45 corresponds to +a (L) (when the low speed stage of the auxiliary speed change structure 240 is engaged, hereinafter simply referred to as low speed stage engagement time) and +a (H) (when the high speed stage of the auxiliary speed change structure 240 is engaged, hereinafter simply referred to as high speed stage engagement time). The switching speed of the speed change output shaft 45 corresponds to +b (L) (low speed stage engagement time) and +b (H) (high speed stage engagement time) in the vehicle travel speed in FIG. 2. +c (L) in FIG. 2 is the maximum vehicle speed in the low speed stage engagement time, and +c (H) is the maximum vehicle speed in the high speed stage engagement time. Concerning the vehicle speed in FIG. 2, "+" indicates the forward travel direction, and "−" indicates the reverse travel direction.

In order to enable the HST power transmission state to be attained, the working vehicle 200 according to the present embodiment, as shown in FIG. 1, further has an HST power transmission mechanism 70 capable of operatively transmitting the rotational power of the motor shaft 16 to the speed change output shaft 45, and an HST clutch mechanism 80 for engaging and disengaging the power transmission of the HST power transmission mechanism 70.

In the present embodiment, the HST power transmission mechanism 70 is configured so as to be capable of operatively transmitting the rotational power of the motor shaft 16 to the speed change output shaft 45 via the planetary input shaft 31.

Specifically, as shown in FIG. 1, the HST power transmission mechanism 70 has the gear train 216, the planetary input shaft 31, an HST drive gear 72 supported by the planetary input shaft 31 so as to be incapable of relatively rotation, and an HST driven gear 74 meshed with the HST drive gear 72 and supported by the speed change output shaft 45 so as to be capable of relative rotation.

In the present embodiment, the HST clutch mechanism 80 is configured so as to be capable of engaging and disengaging power transmission from the HST driven gear 74 to the speed change output shaft 45.

In the present embodiment, the HST clutch mechanism 80 is a friction plate-type clutch mechanism.

Specifically, the HST clutch mechanism 80 has an HST clutch housing 82 supported by the speed change output shaft 45 so as to be incapable of relative rotation; an HST friction plate group 84 including a drive-side friction plate supported by the HST driven gear 74 so as to be incapable of relative rotation and a driven-side friction plate supported by the HST clutch housing 82 so as to be incapable of relative rotation, wherein the driven-side friction plate faces the drive-side friction plate; and a piston (not shown) for frictionally engaging the HST friction plate group 84. The HST clutch mechanism 80 is configured so as to perform engagement and disengagement in accordance with, for example, the supply and discharge of pressurized oil. In this case, the electromagnetic valve group 112 include an electromagnetic valve for switching the supply and discharge of pressurized oil to and from the HST clutch mechanism 80.

In the present embodiment, as shown in FIG. 2, the HST 10 is capable of outputting rotational power in both normal and reverse directions. That is, the HST output at the first HST speed is reverse rotation side rotational power for reverse travel, the HST output at the second HST speed is normal rotation side rotational power for forward travel, and the HST 10 is capable of outputting rotational power in both normal and reverse directions, with the HST neutral speed being provided between the first and second HST speeds.

As shown in FIGS. 2A and 2B, the control device 100: (1) in the HST power transmission state, causes the output adjusting member 20 to be operated such that the speed of the HST output is changed from the first HST speed side toward the second HST speed side in accordance with an accelerating operation of the speed change operation member 90 to the forward travel side; (2) in the first power transmission state, causes the output adjusting member 20 to be operated such that the speed of the HST output is changed from the second HST speed side toward the first HST speed side in accordance with an accelerating operation of the speed change operation member 90 to the forward travel side; (3) when switching from the first power transmission state to the second power transmission state, causes the output adjusting member 20 to be operated such that the speed of the HST output is changed from the HST rotational speed, which is attained at the time of the switching, toward the second HST speed side to the second power transmission state reference HST speed; and in the second power transmission state, causes the output adjusting member 20 to be operated such that the speed of the HST output is changed from the second power transmission state reference HST speed toward the first HST speed side in accordance with an accelerating operation of the speed change operation member 90 to the forward travel side.

The planetary gear mechanism 30 is configured such that the combined rotational power that is output from the second element is accelerated as the speed of the HST output is changed from the second HST speed side to the first HST side.

Here, when the HST output is at the second power transmission state reference HST speed, the continuously variable speed change structure 5 (the second element in the present embodiment) outputs rotational power of the second power transmission state reference speed. The second power transmission state reference speed (i.e., the second power transmission state reference HST speed) is set such that the rotational speed of the speed change output shaft 45 attained when the second element is at the second power transmission state reference speed in the second power transmission state after the switching (in reference to the vehicle travel speed, vehicle speed +bx (L) (when the low speed stage is engaged) or vehicle speed +bx (H) (when the high speed stage is engaged)) matches or is close to the rotational speed of the speed change output shaft 45 attained immediately before switching to the second power transmission state (in reference to the vehicle travel speed, vehicle speed +b (L) (when the low speed stage is engaged) or vehicle speed +b (H) (when the high speed stage is engaged).

Specifically, in the present embodiment, as shown in FIGS. 2A and 2B, when the HST output is at the first HST speed in the first power transmission state, the rotational speed of the speed change output shaft 45 reaches the switching speed (in reference to the vehicle travel speed, vehicle speed +b (L) (when the low speed stage is engaged) or vehicle speed +b (H) (when the high speed stage is engaged).

And, the second power transmission state reference HST speed is set such that the rotational speed of the speed change output shaft 45 attained when the HST output is at the second power transmission state reference HST speed in the second power transmission state (in reference to the vehicle travel speed, vehicle speed +bx (L) (when the low speed stage is engaged) or vehicle speed +bx (H) (when the high speed stage is engaged)) matches the rotational speed of the speed change output shaft 45 attained when the HST output is at the first HST speed in the first power transmission state (in reference to the vehicle travel speed, vehicle speed +b (L) (when the low speed stage is engaged) or vehicle speed +b (H) (when the high speed stage is engaged).

According to this configuration, the rotational speed of the speed change output shaft 45, i.e., the vehicle travel speed, before and after switching between the first and second power transmission states does not change.

As described above, in the present embodiment, when the rotational speed of the speed change output shaft 45 reaches the switching speed (in reference to the vehicle travel speed, vehicle speed +b (L) (when the low speed stage is engaged) or vehicle speed +b (H) (when the high speed stage is engaged)), a stepwise speed change from the first power transmission mechanism 50(1) with a first gear ratio to the second power transmission mechanism 50(2) with a second gear ratio is performed while changing the output of the HST 10. The switching speed of the speed change output shaft 45 is set to be higher than the work speed range set for the working vehicle 200 and, thus, a large load is effectively prevented from being exerted on the driveline during the speed change operation of the multi-speed speed change structure 6.

That is, working vehicles such as tractors and combines that tow a ground work implement often perform heavy duty work such as ploughing, tilling, leveling, and harvesting while traveling at low speed. Generally, for such working vehicles, a vehicle travel speed when performing such heavy duty work is set as a work speed range, and the work speed range is concentrated in a vehicle travel speed region of 0 to 10 km/h.

A stepwise speed change operation performed when the vehicle travel speed is within the work speed range results in a situation in which sufficient driving force is not transmitted to drive wheels while a heavy load is exerted on the working vehicle, and thus there is a possibility that the vehicle travel speed is greatly reduced during the period from the disengagement of the speed change gear that is engaged prior to the speed change operation until the engagement of a speed change gear that should be engaged after the speed change operation. In this case, a large load is exerted on the components of the driveline including the multi-speed speed change structure 6 (a gear speed change structure in the present embodiment) when a speed change stage that should be engaged after the speed change operation is engaged.

In this regard, in the present embodiment, the switching speed of the speed change output shaft 45, which is the timing for switching to the second power transmission mechanism 50(2) while changing the HST output, is set to be higher than the work speed range, and, thus, when the vehicle speed of the working vehicle 200 is in a high load travel region (the hatched region in FIG. 2), the stepwise speed change operation of the multi-speed speed change structure 6 is not performed. Accordingly, a large load can be effectively prevented from being exerted on the driveline when performing the stepwise speed change operation. Also, since the stepwise speed change operation of the multi-speed speed change structure 6 is not performed in the work speed range, a shock-free stable traveling state can be obtained during work regardless of the type of the ground work implement attached to the working vehicle 200.

In particular, in the working vehicle according to the present embodiment, the HST power transmission state is attained when the rotational speed of the speed change output shaft 45 is between the zero speed and the initial speed (in reference to the vehicle travel speed, vehicle speed +a (L) (when the low speed stage is engaged) or vehicle speed +a (H) (when the high speed stage is engaged)) to cause the speed change output shaft 45 to be operatively rotated by HST output, and the first power transmission state is attained when the rotational speed of the speed change output shaft 45 is between the initial speed and the switching speed to cause the speed change output shaft 45 to be operatively rotated by HMT output, and, thus, the switching speed of the speed change output shaft 45, which is the timing of the stepwise speed change operation, can be shifted from the work speed range to the high speed side without requiring increased capacities of the HST 10 and the planetary gear mechanism 30.

Also, the working vehicle according to the present embodiment is, as shown in FIGS. 2A and 2B, configured such that there is no speed difference in the rotational speed of the speed change output shaft 45, i.e., the vehicle travel speed, when switching from the HST power transmission state to the first power transmission state.

That is, the HST 10, the planetary gear mechanism 30, the HST power transmission mechanism 70, and the first power transmission mechanism 50(1) are configured such that the rotational speed of the speed change output shaft 45 when the HST output is at the second HST speed is not different between the HST power transmission state and the first power transmission state.

According to this configuration, transition between the HST power transmission state and the first power transmission state can be smoothly performed, and the stepless speed change state under the first power transmission mechanism 50(1) can be expanded to shift the switching speed to the high speed side without increasing the capacity of the HST 10.

As shown in FIG. 1, in the working vehicle according to the present embodiment, the main speed change structure 1 further has a reverse travel power transmission mechanism 50(R) capable of operatively transmitting the rotational power of the second element to the speed change output shaft 45 as reverse travel rotational power, and a reverse travel clutch mechanism 60(R) for engaging and disengaging the power transmission of the reverse travel power transmission mechanism 50(R).

In the present embodiment, the reverse travel power transmission mechanism 50(R) is configured so as to be capable of reversing the rotational power of the speed change intermediate shaft 43 to transmit the resulting rotational power to the speed change output shaft 45.

Specifically, the reverse travel power transmission mechanism 50(R) has a reverse travel drive gear 52(R) supported by the speed change intermediate shaft 43 so as to capable of relative rotation, a reverse travel driven gear 54(R) supported by the speed change output shaft 45 so as to be incapable of relative rotation, and an idle gear 53(R) meshed with the reverse travel drive gear 52(R) and the reverse travel driven gear 54(R).

In the present embodiment, the reverse travel clutch mechanism 60(R) is a friction plate-type clutch mechanism.

Specifically, the reverse travel clutch mechanism 60(R) has a reverse travel clutch housing 62(R) supported by the speed change intermediate shaft 43 so as to be incapable of relative rotation; a reverse travel friction plate group 64(R) including a reverse travel drive-side friction plate supported by the reverse travel clutch housing 62(R) so as to be incapable of relative rotation and a reverse travel driven-side friction plate supported by the reverse travel drive gear 52(R) so as to be incapable of relative rotation, wherein the reverse travel driven-side friction plate faces the reverse travel drive-side friction plate; and a reverse travel piston (not shown) for frictionally engaging the reverse travel friction plate group 64(R).

The reverse travel clutch mechanism 60(R) is configured so as to perform engagement and disengagement in accordance with, for example, the supply and discharge of pressurized oil. In this case, the electromagnetic valve group 112 include an electromagnetic valve for switching the supply and discharge of pressurized oil to and from the reverse travel clutch mechanism 60(R). In the present embodiment, the reverse travel clutch housing 62(R) and the first clutch housing 62(1) are integrally formed as a common housing.

The control device 100 causes the HST power transmission state to be attained when the rotational speed of the speed change output shaft 45 is in a state up to the reverse rotation side switching speed (in reference to the vehicle travel speed, vehicle speed −b (L) (when the low speed stage is engaged) or vehicle speed −b (H) (when the high speed stage is engaged)), and when the rotational speed of the speed change output shaft 45 is greater than or equal to the reverse rotation side switching speed, cancels the HST power transmission state and engages the reverse travel clutch mechanism 60(R) to cause a reverse travel power transmission state to be attained in which the rotational power of the second element is operatively transmitted to the speed change output shaft 45 via the reverse travel power transmission mechanism 50(R).

And, the control device 100: (1) in the HST power transmission state, causes the output adjusting member 20 to be operated such that the speed of the HST output is changed from the second HST speed side toward the first HST speed side in accordance with an accelerating operation of the speed change operation member 90 to the reverse travel side; (2) when switching from the HST power transmission state to the reverse travel power transmission state, causes the output adjusting member 20 to be operated such that the speed of the HST output is changed from the HST rotational speed, which is attained at the time of the switching, toward the second HST speed side to the reverse travel power transmission state reference HST speed; and (3) in the reverse travel power transmission state, causes the output adjusting member 20 to be operated such that the speed of the HST output is changed from the reverse travel power transmission state reference HST speed toward the first HST speed side in accordance with an accelerating operation of the speed change operation member 90 to the reverse travel side.

Here, the reverse travel power transmission state reference HST speed is set such that the rotational speed of the speed change output shaft 45 attained when the HST output is at the reverse travel power transmission state reference HST speed in the reverse travel power transmission state (in reference to the vehicle travel speed, vehicle speed −bx (L) (when the low speed stage is engaged) or vehicle speed −bx (H) (when the high speed stage is engaged)) matches the rotational speed of the speed change output shaft 45 attained when the HST output is at the first HST speed in the HST power transmission state (in reference to the vehicle travel speed, vehicle speed −b (L) (when the low speed stage is engaged) or vehicle speed −b (H) (when the high speed stage is engaged).

According to the present configuration, a change in the rotational speed of the speed change output shaft 45, i.e., the vehicle travel speed, before and after switching between the HST power transmission state and the reverse travel power transmission state can be effectively prevented or reduced.

Second Embodiment

Figure 3:
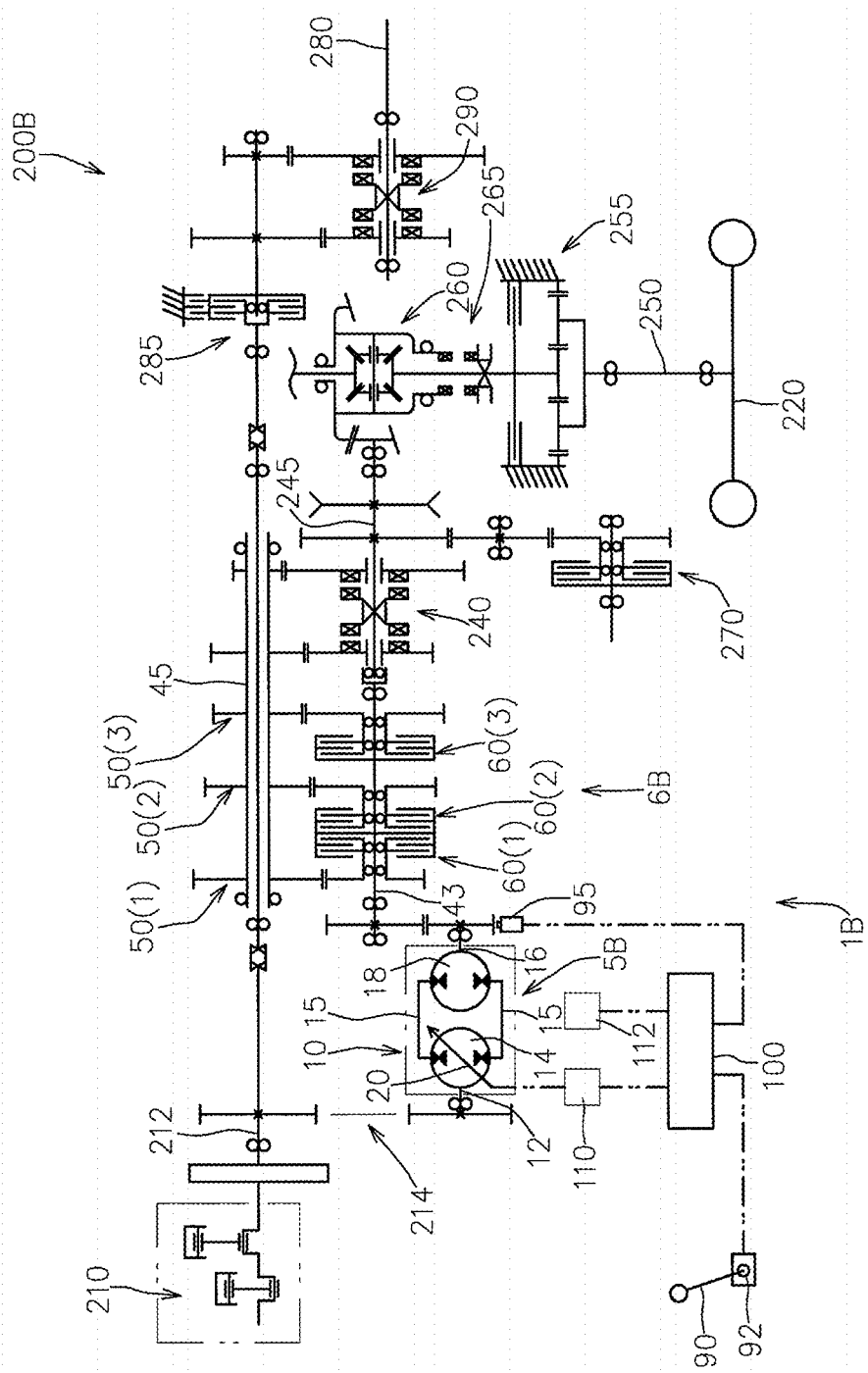
FIG. 3 is a schematic view of a power transmission of a working vehicle according to a second embodiment of the present invention.

Below, another embodiment of the working vehicle according to the present invention will now be described with reference to the appended drawings. FIG. 3 shows a schematic view of the power transmission of a working vehicle 200B according to the present embodiment. In the drawing, the same components as those in the first embodiment are given the same reference numbers, and descriptions thereof are omitted as appropriate.

Compared with the working vehicle 200 according to the first embodiment, the working vehicle 200B according to the present embodiment includes a main speed change structure 1B in place of the main speed change structure 1. The main speed change structure 1B has a continuously variable speed change structure 5B and a multi-speed speed change structure 6B.

The continuously variable speed change structure 5B is different from the continuously variable speed change structure 5 of the first embodiment in lacking the planetary gear mechanism 30. That is, as shown in FIG. 3, the continuously variable speed change structure 5B is composed substantially solely of the HST 10.

The multi-speed speed change structure 6B is configured so as to be capable of changing the speed of the output of the continuously variable speed change structure 5B in a stepwise manner. In the present embodiment, the multi-speed speed change structure 6B is configured so as to change the rotational speed of the output of the continuously variable speed change structure 5B into three different speeds and operatively transmit the resulting output to the speed change output shaft 45.

Specifically, as shown in FIG. 3, the multi-speed speed change structure 6B has first to third power transmission mechanisms 50(1) to 50(3) for changing the speed of the output of the continuously variable speed change structure 5B according to a first gear ratio, a second gear ratio that results in a higher speed than the first gear ratio, and a third gear ratio that results in a higher speed than the second gear ratio, respectively, and operatively transmitting the resulting output to the speed change output shaft 45; and first to third clutch mechanisms 60(1) to 60(3) for engaging and disengaging the power transmission of the first to third power transmission mechanisms 50(1) to 50 (3), respectively.

Figure 4:
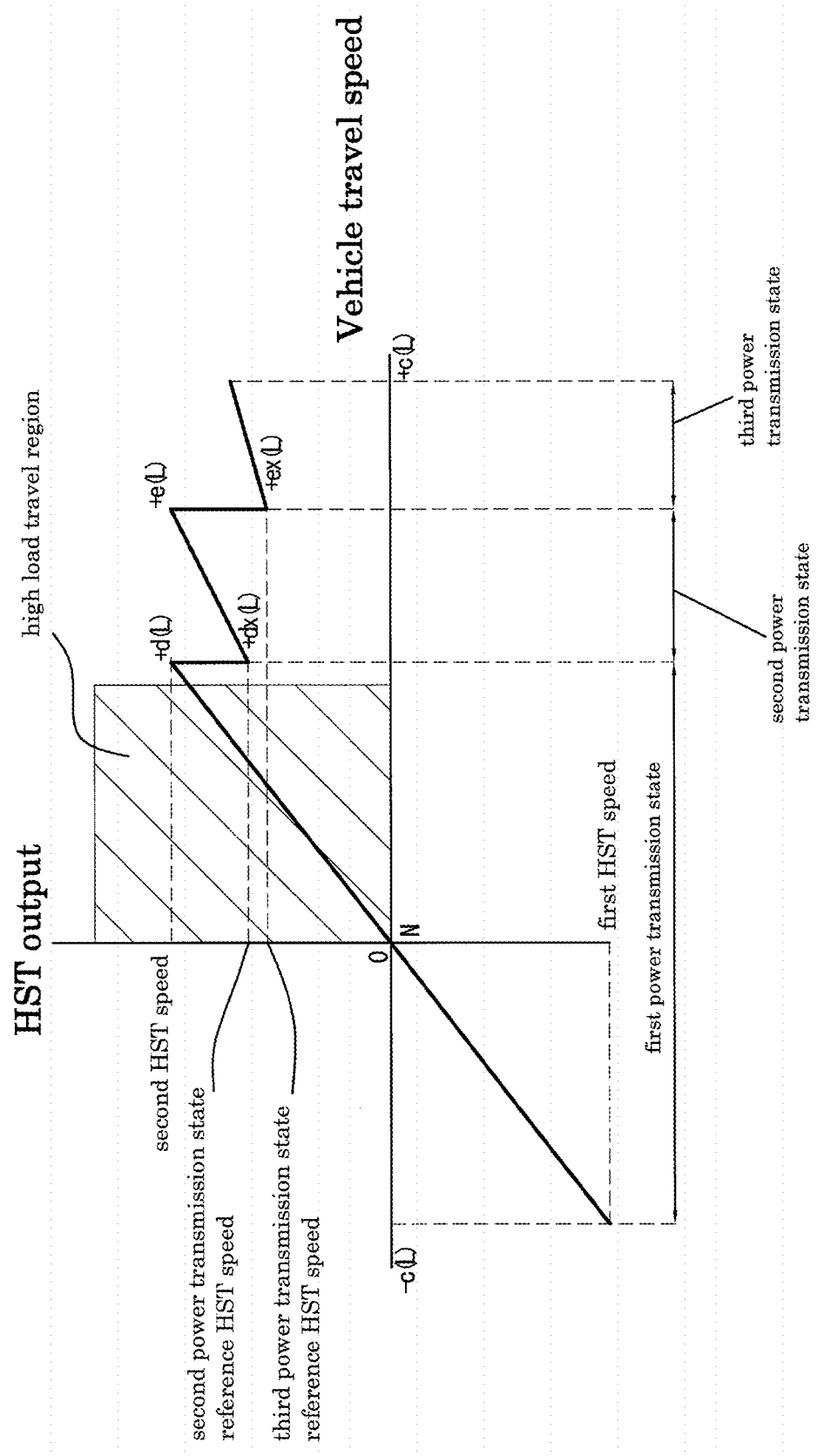
FIG. 4 is a graph showing the relationship between the vehicle travel speed and the rotational speed of HST output in the working vehicle according to the second embodiment, and is a graph obtained when a low speed stage of the auxiliary speed change structure is engaged.

FIG. 4 is a graph showing the relationship between the vehicle travel speed and the rotational speed of HST output concerning the working vehicle 200B. FIG. 4 is a graph obtained when a low speed stage of the auxiliary speed change structure 240 is engaged.

As shown in FIG. 4, the control device 100, based on the detection signal of the output sensor 95, causes a first power transmission state to be attained in which the first clutch mechanism 60(1) is engaged and the second and third clutch mechanisms 60(2), 60(3) are disengaged to transmit power via the first power transmission mechanism 50(1) in a low speed state until the rotational speed of the speed change output shaft 45 reaches a switching speed (in reference to the vehicle travel speed in FIG. 4, +d (L)); causes a second power transmission state to be attained in which the second clutch mechanism 60(2) is engaged and the first and third clutch mechanisms 60(1), 60(3) are disengaged to perform power transmission via the second power transmission mechanism 50(2) in an intermediate speed state when the rotational speed of the speed change output shaft 45 is greater than or equal to the switching speed and less than or equal to a second switching speed (in reference to the vehicle travel speed in FIG. 4, +e (L)); and causes a third power transmission state to be attained in which the third clutch mechanism 60(3) is engaged and the first and second clutch mechanisms 60(1), 60(2) are disengaged to perform power transmission via the third power transmission mechanism 50(3) in a high speed state in which the rotational speed of the speed change output shaft 45 exceeds the second switching speed.

As shown in FIG. 4, the HST 10 is capable of outputting rotational power in both normal and reverse directions. That is, the HST 10 is capable of changing the speed in a stepless manner between the HST output at the first HST speed, which is reverse rotation side rotational power for reverse travel, and the HST output at the second HST speed, which is normal rotation side rotational power for forward travel, and is configured such that the rotational speed is substantially zero at a neutral speed N between the first and second HST speeds.

In addition to performing the above operational control on the multi-speed speed change structure 6B, the control device 100 performs the following operational control on the HST 10 that constitutes the continuously variable speed change structure 5B.

That is, as shown in FIG. 4, the control device 100: (1) in the first power transmission state, causes the output adjusting member 20 to be operated such that the HST output is at neutral speed in accordance with an operation of the speed change operation member 90 to a zero speed position, the HST output is accelerated from the neutral speed to the reverse rotation side in accordance with an accelerating operation of the speed change operation member 90 from the zero speed position to the reverse rotation side, and the HST output is accelerated from the neutral speed to the normal rotation side in accordance with an accelerating operation of the speed change operation member 90 from the zero speed position to the normal rotation side; (2) when switching from the first power transmission state to the second power transmission state, causes the output adjusting member 20 to be operated such that the HST output is decelerated from the second HST speed to the second power transmission state reference HST speed; (3) in the second power transmission state, causes the output adjusting member 20 to be operated such that the HST output is accelerated from the second power transmission state reference HST speed to the second HST speed side in accordance with an accelerating operation of the speed change operation member 90 to the forward travel side; (4) when switching from the second power transmission state to the third power transmission state, causes the output adjusting member 20 to be operated such that the HST output is decelerated from the second HST speed to the third power transmission state reference HST speed; and (5) in the third power transmission state, causes the output adjusting member 20 to be operated such that the HST output is accelerated from the third power transmission state reference HST speed to the second HST speed side in accordance with an accelerating operation of the speed change operation member 90 to the forward travel side.

In the present embodiment as well, the switching speed is set to be higher than the work speed range (0 to 10 km/h in reference to the vehicle travel speed). In the present embodiment, the switching speed can be shifted more toward the high speed side than the work speed range is by suitably setting the capacity of the HST 10 and the rotational speed of the pump shaft 12 (i.e., the gear ratio of the gear train 214 for transmitting rotational power from the main drive shaft 212 to the pump shaft 12).

In the present embodiment, as shown in FIG. 4, the second power transmission state reference HST speed is set such that the rotational speed of the speed change output shaft 45 attained when the HST output is at the second HST speed in the first power transmission state (in reference to the vehicle travel speed, vehicle speed +d (L)) matches the rotational speed of the speed change output shaft 45 attained when the HST output is at the second power transmission state reference HST speed in the second power transmission state (in reference to the vehicle travel speed, vehicle speed +dx (L)).

The third power transmission state reference HST speed is set such that the rotational speed of the speed change output shaft 45 attained when the HST output is at the second HST speed in the second power transmission state (in reference to the vehicle travel speed, vehicle speed +e (L)) matches the rotational speed of the speed change output shaft 45 attained when the HST output is at the third power transmission state reference HST speed in the third power transmission state (in reference to the vehicle travel speed, vehicle speed +ex (L)).

Third Embodiment

Figure 5:
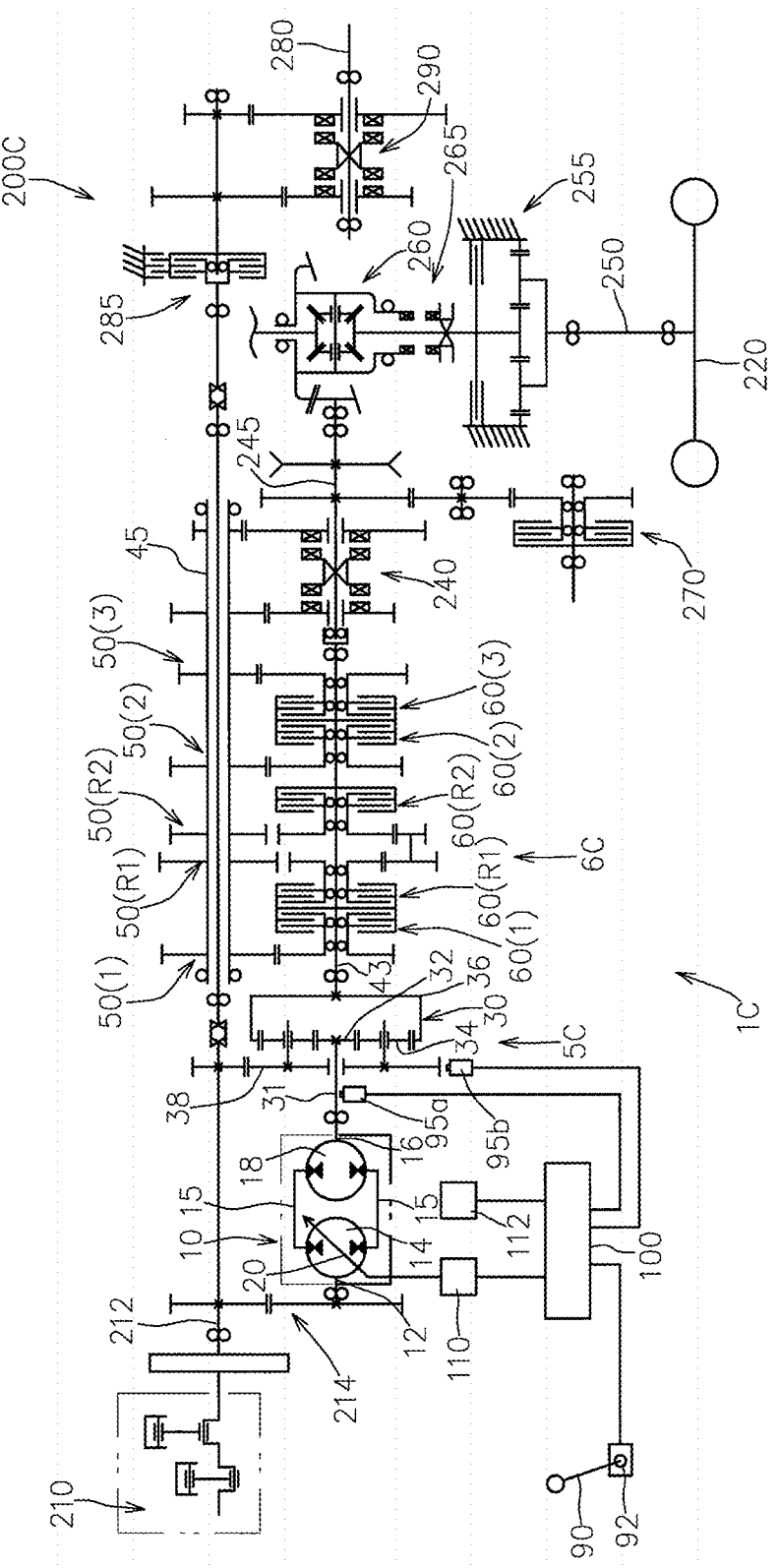
FIG. 5 is a schematic view of a power transmission of a working vehicle according to a third embodiment of the present invention.

Below, yet another embodiment of the working vehicle according to the present invention will now be described with reference to the appended drawings. FIG. 5 shows a schematic view of the power transmission of a working vehicle 200C according to the present embodiment. In the drawing, the same components as those in the first and second embodiments are given the same reference numbers, and descriptions thereof are omitted as appropriate.

Compared with the working vehicle 200 according to the first embodiment, the working vehicle 200C according to the present embodiment includes a main speed change structure 1C in place of the main speed change structure 1.

The main speed change structure 1C has a continuously variable speed change structure 5C and a multi-speed speed change structure 6C. The continuously variable speed change structure 5C has an HMT structure formed of the HST 10 and the planetary gear mechanism 30.

The multi-speed speed change structure 6C is configured so as to be capable of changing the speed of the output of the continuously variable speed change structure 5C in a stepwise manner. In the present embodiment, the multi-speed speed change structure 6C is configured so as to change the rotational speed of the output of the continuously variable speed change structure 5C into five speed stages including three speed stages on the forward travel side and two speed stages on the reverse travel side and operatively transmit the resulting output to the speed change output shaft 45.

Specifically, as shown in FIG. 5, the multi-speed speed change structure 6C has first to third power transmission mechanisms 50(1), 50(2), and 50(3) for changing the speed of the output of the continuously variable speed change structure 5C according to a forward travel side first gear ratio, a forward travel side second gear ratio that results in a higher speed than the forward travel side first gear ratio, and a forward travel side third gear ratio that results in a higher speed than the forward travel side second gear ratio, respectively, to operatively transmit the resulting output to the speed change output shaft 45; first to third clutch mechanisms 60(1), 60(2), and 60(3) for engaging and disengaging the power transmission of the first to third power transmission mechanisms 50(1) to 50(3), respectively; reverse travel side first and second power transmission mechanisms 50(R1), 50(R2) for changing the speed of the output of the continuously variable speed change structure 5C according to a reverse travel side first gear ratio and a reverse travel side second gear ratio that results in a higher speed than the reverse travel side first gear ratio, respectively, to operatively transmit the resulting output to the speed change output shaft 45; and reverse travel side first and second clutch mechanisms 60(R1), 60(R2) for engaging and disengaging the power transmission of the reverse travel side first and second power transmission mechanisms 50(R1), 50(R2), respectively.

Figure 6:
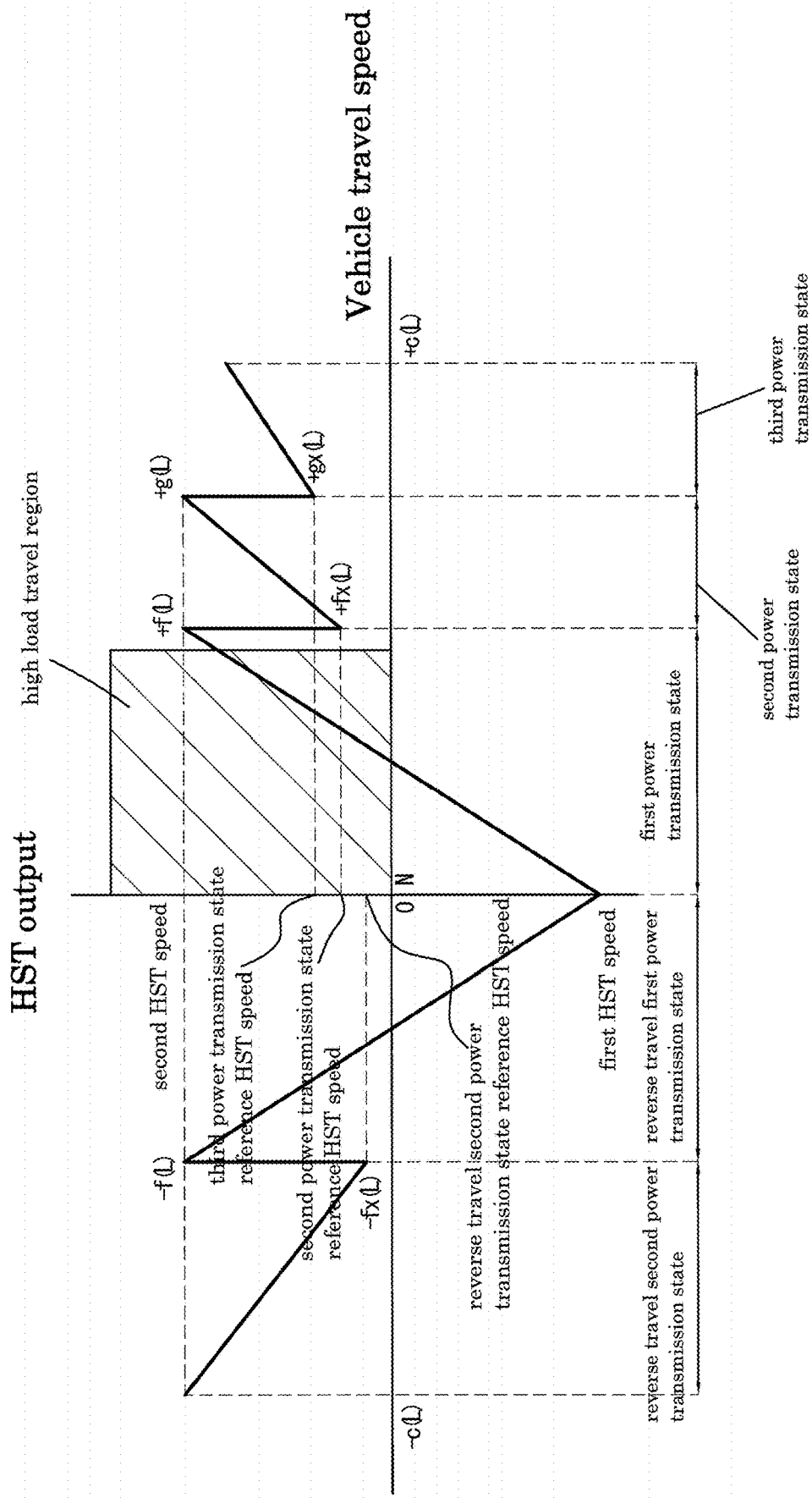
FIG. 6 is a graph showing the relationship between the vehicle travel speed and the rotational speed of HST output in the working vehicle according to the third embodiment, and is a graph obtained when a low speed stage of the auxiliary speed change structure is engaged.

FIG. 6 is a graph showing the relationship between the vehicle travel speed and the rotational speed of HST output concerning the working vehicle 200C. FIG. 6 is a graph obtained when a low speed stage of the auxiliary speed change structure 240 is engaged.

As shown in FIG. 6, the control device 100, based on the detection signal of the output sensor 95, causes a first power transmission state to be attained in which the first clutch mechanism 60(1) is engaged and the other clutch mechanisms are disengaged to perform power transmission via the first power transmission mechanism 50(1) in a low speed state until the rotational speed of the speed change output shaft 45 reaches a switching speed (in reference to the vehicle travel speed in FIG. 6, +f (L)). The control device 100 causes a second power transmission state to be attained in which the second clutch mechanism 60(2) is engaged and the other clutch mechanisms are disengaged to perform power transmission via the second power transmission mechanism 50(2) in an intermediate speed state in which the rotational speed of the speed change output shaft 45 is greater than or equal to the switching speed and is less than or equal to a second switching speed (in reference to the vehicle travel speed in FIG. 6, +g (L)). The control device 100 causes a third power transmission state to be attained in which the third clutch mechanism 60(3) is engaged and the other clutch mechanisms are disengaged to perform power transmission via the third power transmission mechanism 50(3) in a high speed state in which the rotational speed of the speed change output shaft 45 exceeds the second switching speed; and, on the other hand, as the speed change output shaft 45 starts to rotate to the reverse travel side, the control device 100 causes a reverse travel first power transmission state to be attained in which the reverse travel side first clutch mechanism 60(R1) is engaged and the other clutch mechanism is disengaged to perform power transmission via the reverse travel side first power transmission mechanism 50(R1) in a reverse travel side low speed state until the rotational speed of the speed change output shaft reaches a reverse travel side switching speed (in reference to the vehicle travel speed in FIG. 6, −f (L)); and causes a reverse travel second power transmission state to be attained in which the reverse travel side second clutch mechanism 60(R2) is engaged and the other clutch mechanism is disengaged to perform power transmission via the second power transmission mechanism 50(R2) in a reverse travel side high speed state in which the rotational speed of the speed change output shaft 45 is higher than or equal to the reverse travel side switching speed.

As shown in FIG. 6, in the present embodiment, the HMT structure is configured such that when the HST output is at the first HST speed, the HMT output is at the zero speed, and the HMT output is accelerated to one side around the axis as the speed of the HST output is changed from the first HST speed to the second HST speed.

Specifically, the HST 10 is capable of changing the speed in a stepless manner between the HST output at the first HST speed, which is reverse rotation side rotational power for reverse travel, and the HST output at the second HST speed, which is normal rotation side rotational power for forward travel, and is configured such that the rotational speed is substantially zero at the neutral speed N between the first and second HST speeds.

Accordingly, the planetary gear mechanism is configured such that the combined rotational power that is output from the second element is accelerated to one side around the axis as the speed of the HST output that is input into the third element is changed from the first HST speed on the reverse rotation side to the second HST speed on the normal rotation side via the neutral speed.

In addition to performing the above operational control on the multi-speed speed change structure 6C, the control device 100 performs the following operational control on the continuously variable speed change structure 5C.

That is, as shown in FIG. 6, the control apparatus 100: (1) in the first power transmission state, causes the output adjusting member to be operated such that the HST output is at the first HST speed in accordance with an operation of the speed change operation member 90 to a zero speed position, and the HST output is accelerated from the first HST speed to the second HST speed in accordance with an accelerating operation of the speed change operation member 90 from the zero speed position to the forward travel side; (2) when switching from the first power transmission state to the second power transmission state, causes the output adjusting member 20 to be operated such that the HST output is decelerated from the second HST speed to the second power transmission state reference HST speed; (3) in the second power transmission state, causes the output adjusting member 20 to be operated such that the HST output is accelerated from the second power transmission state reference HST speed to the second HST speed side in accordance with an accelerating operation of the speed change operation member 90 to the forward travel side; (4) when switching from the second power transmission state to the third power transmission state, causes the output adjusting member 20 to be operated such that the HST output is decelerated from the second HST speed to the third power transmission state reference HST speed; (5) in the third power transmission state, causes the output adjusting member 20 to be operated such that the HST output is accelerated from the third power transmission state reference HST speed to the second HST speed side in accordance with an accelerating operation of the speed change operation member 90 to the forward travel side; (6) in the reverse travel first power transmission state, causes the output adjusting member to be operated such that the HST output is accelerated from the first HST speed to the second HST speed in accordance with an accelerating operation of the speed change operation member from the zero speed position to the reverse travel side; (7) when switching from the reverse travel first power transmission state to the reverse travel second power transmission state, causes the output adjusting member 20 to be operated such that the HST output is decelerated from the second HST speed to the second power transmission state reference HST speed; and (8) in the reverse travel second power transmission state, causes the output adjusting member 20 to be operated such that the HST output is accelerated from the reverse travel second power transmission state reference HST speed to the second HST speed side in accordance with an accelerating operation of the speed change operation member 90 to the reverse travel side.

In the present embodiment as well, the switching speed is set to be higher than the work speed range (0 to 10 km/h in reference to the vehicle travel speed). In the present embodiment, the switching speed can be shifted more toward the high speed side than the work speed range is by suitably setting the capacity of the HST 10, the gear ratio of the planetary gear mechanism 30, and the rotational speed of the pump shaft 12 (i.e., the gear ratio of the gear train 214 for transmitting rotational power from the main drive shaft 212 to the pump shaft 12).

In the present embodiment, as shown in FIG. 6, the second power transmission state reference HST speed is set such that the rotational speed of the speed change output shaft 45 attained when the HST output is at the second HST speed in the first power transmission state (in reference to the vehicle travel speed, vehicle speed +f (L)) matches the rotational speed of the speed change output shaft 45 attained when the HST output is at the second power transmission state reference HST speed in the second power transmission state (in reference to the vehicle travel speed, vehicle speed +fx (L)).

The third power transmission state reference HST speed is set such that the rotational speed of the speed change output shaft 45 attained when the HST output is at the second HST speed in the second power transmission state (in reference to the vehicle travel speed, vehicle speed +g (L)) matches the rotational speed of the speed change output shaft 45 attained when the HST output is at the third power transmission state reference HST speed in the third power transmission state (in reference to the vehicle travel speed, vehicle speed +gx (L)).

Moreover, the reverse travel second power transmission state reference HST speed is set such that the rotational speed of the speed change output shaft 45 attained when the HST output is at the second HST speed in the reverse travel first power transmission state (in reference to the vehicle travel speed, vehicle speed −f (L)) matches the rotational speed of the speed change output shaft 45 attained when the HST output is at the reverse travel second power transmission state reference HST speed in the reverse travel second power transmission state (in reference to the vehicle travel speed, vehicle speed −fx (L)).

What is claimed is:

1. A working vehicle, comprising:
a drive source, drive wheels,
a speed change output shaft for outputting rotational power toward the drive wheels;
a main speed change structure for changing a speed of rotational power from the drive source and operatively transmitting the resulting rotational power to the speed change output shaft;
a speed change operation member, an output sensor for directly or indirectly detecting a rotational speed of the speed change output shaft; and
a control device responsible for operational control of the main speed change structure, wherein the main speed change structure comprises a continuously variable speed change structure for changing a speed of rotational power operatively input from the drive source in a stepless manner, and a multi-speed speed change structure capable of switching between at least a first power transmission state with a first gear ratio and a second power transmission state with a second gear ratio providing a higher speed than the first gear ratio,
wherein the control device, based on a detection signal of the output sensor, is configured to cause the continuously variable speed change structure to be accelerated to a forward travel side in accordance with an accelerating operation of the speed change operation member in a forward travel direction while causing the multi-speed speed change structure to be in a first power transmission state,
wherein when in a low speed state until the rotational speed of the speed change output shaft reaches a predetermined switching speed the control device is configured to cause the continuously variable speed change structure to be decelerated to a second power transmission state reference speed while causing the multi-speed speed change structure to be changed from the first power transmission state to a second power transmission state,
wherein when the rotational speed of the speed change output shaft reaches the switching speed the control device is configured to cause the continuously variable speed change structure to be accelerated from the second power transmission state reference speed to the forward travel side in accordance with an accelerating operation of the speed change operation member to the forward travel side while causing the multi-speed speed change structure to be in the second power transmission state, and
wherein when in a high speed state in which the rotational speed of the speed change output shaft is higher than the switching speed the switching speed is set to exceed a work speed range.

2. The working vehicle according to claim 1, wherein the multi-speed speed change structure has first and second power transmission mechanisms capable of operatively transmitting rotational power operatively input from the continuously variable speed change structure to the speed change output shaft at the first gear ratio and the second gear ratio, respectively, and first and second clutch mechanisms for engaging and disengaging power transmission of the first and second power transmission mechanisms, respectively; and
wherein the multi-speed speed changes structure attains the first power transmission state by engaging the first clutch mechanism and disengaging the second clutch mechanism, and attains the second power transmission state by disengaging the first clutch mechanism and engaging the second clutch mechanism.

3. The working vehicle according to claim 2, wherein the continuously variable speed change structure comprises an HST for changing a speed of rotational power operatively input from the drive source into a pump shaft between at least a first HST speed and a second HST speed in a stepless manner in accordance with an operational position of an output adjusting member and outputting the resulting rotational power from a motor shaft, and
wherein the continuously variable speed change structure further comprises a planetary gear mechanism having first, second, and third elements,
wherein the planetary gear mechanism combines rotational power operatively input from the drive source to the first element and rotational power operatively input from the HST to the third element and outputs the combined rotational power from the second element as output of the continuously variable speed change structure,
wherein the main speed change structure further comprises an HST power transmission mechanism capable of operatively transmitting rotational power of the motor shaft to the speed change output shaft and an HST clutch mechanism for engaging and disengaging power transmission of the HST power transmission mechanism,
wherein the control device cancels the first power transmission state and attains an HST power transmission state in which the HST clutch mechanism is engaged until the rotational speed of the speed change output shaft reaches an initial speed that is lower than the switching speed, and the control device cancels the HST power transmission state and attains the first power transmission state in which the rotational speed of the speed change output shaft is between the initial speed and the switching speed, wherein the control devices further causes the output adjusting member to be operated such that, in the HST power transmission state, a speed of HST output is changed from the first HST speed to the second HST speed in accordance with an accelerating operation of the speed change operation member to a forward travel side, wherein in the first power transmission state, the speed of HST output is changed from the second HST speed to the first HST speed in accordance with an accelerating operation of the speed change operation member to a forward travel side;

wherein when switching from the first power transmission state to the second power transmission state, the speed of HST output is changed from an HST rotational speed, which is attained at a time of the switching, towards a second power transmission state reference HST speed at which a rotational speed of the second element is at a second power transmission state reference speed, wherein in the second power transmission state, the speed of HST output is changed from the second power transmission state reference HST speed toward the first HST speed in accordance with an accelerating operation of the speed change operation member to the forward travel side, and wherein the planetary gear mechanism is configured such that the combined rotational power output from the second element is accelerated as the speed of HST output is changed from the second HST speed side to a first HST speed side.

4. The working vehicle according to claim 3, wherein the HST, the planetary gear mechanism, the HST power transmission mechanism, and the first power transmission mechanism are configured such that there is no speed difference in the rotational speed of the speed change output shaft when switching between the HST power transmission state and the first power transmission state.

5. The working vehicle according to claim 3, wherein the HST output at the first HST speed is a reverse rotation side rotational power for reverse travel, the HST output at the second HST speed is a normal rotation side rotational power for forward travel, and the HST is capable of outputting rotational power in both normal and reverse directions, with a neutral speed being provided between the first and second HST speeds;

wherein the main speed change structure further has a reverse travel power transmission mechanism capable of operatively transmitting rotational power of the second element to the speed change output shaft as reverse travel rotational power and a reverse travel clutch mechanism for engaging and disengaging power transmission of the reverse travel power transmission mechanism;

wherein the control device attains the HST power transmission state until the rotational speed of the speed change output shaft reaches a reverse travel side switching speed, and the control device cancels the HST power transmission state and engages the reverse travel clutch mechanism to attain a reverse travel power transmission state in which the rotational power of the second element is operatively transmitted to the speed change output shaft via the reverse travel power transmission mechanism when the rotational speed of the speed change output shaft is greater than or equal to the reverse travel side switching speed, wherein the control device further causes the output adjusting member to be operated such that, in the HST power transmission state, the speed of HST output is a neutral speed in accordance with an operation of the speed changing operation member to a zero speed position, wherein the speed of HST output is changed from the neutral speed toward the first HST speed in accordance with an accelerating operation of the speed change operation member from the zero speed position to a reverse travel side, wherein when switching from the HST power transmission state to the reverse travel power transmission state, the speed of HST output is changed from a rotational speed, which is attained at a time of the switching, to the second HST speed side to a predetermined extent, and, wherein in the reverse travel power transmission state, the speed of HST output is changed toward the first HST speed in accordance with an accelerating operation of the speed change operation member to the reverse travel side.

6. The working vehicle according to claim 5, wherein the control device causes the output adjusting member to be operated such that HST output is at a reverse travel power transmission state reference HST speed when the HST power transmission state is switched to the reverse travel power transmission state, and wherein the reverse travel power transmission state reference HST speed is set such that the rotational speed of the speed change output shaft attained when the HST output is at the first HST speed in the HST power transmission state matches the rotational speed of the speed change output shaft attained when the HST output is at the reverse travel power transmission state reference HST speed in the reverse travel power transmission state.

7. The transmission structure according to claim 3, wherein a carrier, an internal gear, and a sun gear of the planetary gear mechanism form the first, second, and third elements, respectively.

8. The working vehicle according to claim 2, wherein the continuously variable speed change structure comprises an HST for changing a speed of rotational power operatively input from the drive source into a pump shaft between at least a first HST speed and a second HST speed in a stepless manner in accordance with an operational position of an output adjusting member and outputting the resulting rotational power from a motor shaft as output of the continuously variable speed change structure, wherein the HST is capable of outputting rotational power in both normal and reverse directions such that HST output at the first HST speed is reverse rotation side rotational power for reverse travel, the HST output at the second HST speed is normal rotation side rotational power for forward travel, and the HST output at a neutral speed between the first and second HST speeds is a substantially zero rotational speed, wherein the control device causes the output adjusting member to be operated such that the HST is at the neutral speed in accordance with an operation of the speed change operation member to a zero speed position, the HST output is accelerated to a reverse rotation side in accordance with an accelerating operation of the speed change operation member from the zero speed position to a reverse travel side, and the HST output is accelerated to a normal rotation side in accordance with acceleration operation of the speed change operation member from the zero speed position to the forward travel side, and wherein when the HST output is at the second HST speed in the first power transmission state, the rotational speed of the speed change output shaft reaches the switching speed.

9. The working vehicle according to claim 2, wherein the continuously variable speed change structure comprises an HST for changing a speed of rotational power operatively input from the drive source into a pump shaft between at least a first HST speed and a second HST speed in a stepless manner in accordance with an operational position of an output adjusting member and outputting the resulting rotational power from a motor shaft, and a planetary gear mechanism having first, second, and third elements wherein the planetary gear mechanism combines rotational power operatively input from the drive source to the first element and rotational power operatively input from the HST to the third element, and outputs the combined rotational power from the second element as output of the continuously variable speed change structure, wherein the main speed change structure further has a reverse travel power transmission mechanism capable of operatively transmitting the rotational power of the second element to the speed change output shaft as reverse travel rotational power, and a reverse travel clutch mechanism for engaging and disengaging power transmission of the reverse travel power transmission mechanism, wherein an HMT structure formed of the HST and the planetary gear mechanism is configured such that HMT output that is output from the second element is at a zero speed when HST output is at the first HST speed, and is accelerated as the speed of the HST output is changed from the first HST speed to the second HST speed, wherein the control device cancels the first power transmission state and engages the reverse travel clutch mechanism to attain a reverse travel power transmission state in which the rotational power of the second element is operatively transmitted to the speed change output shaft via the reverse travel power transmission mechanism when the speed change operation member is operated from a zero speed position to a reverse travel side, wherein the control device further causes the output adjusting member to be operated such that the HST output is at the first HST speed in accordance with an operation of the speed changing operation member to the zero speed position, and the HST output is accelerated from the first HST speed to the second HST speed in accordance with an accelerating operation of the speed change operation member from the zero speed position to a forward travel side and a reverse travel side, and wherein when the HST output is at the second HST speed in the first power transmission state, the rotational speed of the speed change output shaft reaches the switching speed.

10. The working vehicle according to claim 1, wherein the second power transmission state reference speed is set to a speed such that the rotational speed of the speed change output shaft is not different before and after switching from the first power transmission state to the second power transmission state.

11. The working vehicle according to claim 1, further comprising an auxiliary speed change structure disposed in the driveline downstream of the speed change output shaft.

* * * * *